United States Patent [19]

Kurokawa

[11] 4,389,666

[45] Jun. 21, 1983

[54] COLOR TELEVISION CAMERA SYSTEM

[75] Inventor: Hiromichi Kurokawa, Atsugi, Japan

[73] Assignee: Sony Corporation, Tokyo, Japan

[21] Appl. No.: 244,722

[22] Filed: Mar. 17, 1981

[30] Foreign Application Priority Data

Mar. 31, 1980 [JP] Japan .................................. 55-41333

[51] Int. Cl.³ .............................................. H04N 9/07
[52] U.S. Cl. ...................................................... 358/47
[58] Field of Search ........................... 358/44, 47, 7, 15

[56] References Cited

U.S. PATENT DOCUMENTS

| | | | |
|---|---|---|---|
| 3,647,948 | 3/1972 | Eto et al. | 358/44 |
| 3,828,121 | 8/1974 | Brandinger et al. | 358/47 |
| 4,030,118 | 6/1977 | Dischert | 358/44 |
| 4,041,528 | 8/1977 | Miyoshi et al. | 358/47 |

OTHER PUBLICATIONS

Watanabe et al, "Single-Tube Color TV Camera", *Toshiba Review*, No. 100, pp. 79-83, Nov.-Dec. 1975.

*Primary Examiner*—John C. Martin
*Attorney, Agent, or Firm*—Hill, Van Santen, Steadman, Chiara & Simpson

[57] ABSTRACT

A color television camera system including an image pickup tube and having color filter means for forming color separated images of an object and including means for deriving composite color video signals from the image pick-up tube which represent the color separated images with the color filter having a first set of color stripes for generating a first chrominance signal component having a first frequency band and having in-phase carrier with respect to each horizontal scan and a second set of color stripes and a third set of color stripes for generating second and third chrominance signal components which have frequency bands on both sides of the first frequency band respectively with the carrier phase of the second and third chrominance signals being reversed with respect to each horizontal scan.

8 Claims, 6 Drawing Figures

COLOR TELEVISION CAMERA SYSTEM

BACKGROUND OF THE INVENTION

1. Field of the Invention

This invention relates in general to a color television camera system having a single color image pickup tube which uses a stripe filter for resolving the color components of an image.

2. Description of the Prior Art

It is well known in the art to provide a monotube image pickup device which is equipped with two or three colored striped filter arrangements in front of the color pickup tube. Such arrangement is shown, for example, in U.S. Pat. Nos. 4,030,118 and 4,041,528. In the image pickup device of these types, the video output signal is carrier modulated with a stripe filter so that its chrominance components have different phases or lie in different bands. In image pickup devices which use three colored striped filters, if the carrier frequencies of the respective chrominance components are arranged close to each other so that the luminance signal contained in the lower frequency band of the modulated video signal occupies a sufficiently wide band width the problem arises that the separation of each chrominance component becomes difficult and the cross-talk between the respective chrominance components increases. On the other hand, if the carrier frequency of each chrominance component is widely spaced, the high frequency component of the luminance signal becomes so restricted by the carrier component that the resolution of a picture is difficult and the picture becomes degraded. Also, a quasi-video signal or beat interference is generated due to the spectrum characteristic of the color filter used, as well as the γ-characteristic of the photoelectric conversion device and other factors cause the picture to be degraded. In the image pickup devices using two colored stripe filters, the white balance and the balance of the color reproduction are liable to be destroyed because of the dark current of the image pickup tube as well as the non-linearity due to the degree of modulation wherein the degree of modulation is lowered as the amount of light is increased and the shading also destroys the balance so that complex compensating circuits are required and the system becomes instable.

SUMMARY OF THE INVENTION

The present invention provides a mono-color image tube pickup device which is free of the problems of the prior art.

Other objects, features and advantages of the invention will be apparent from the following description and claims when read in view of the drawings in which:

DESCRIPTION OF THE PREFERRED EMBODIMENTS

Figure 1:
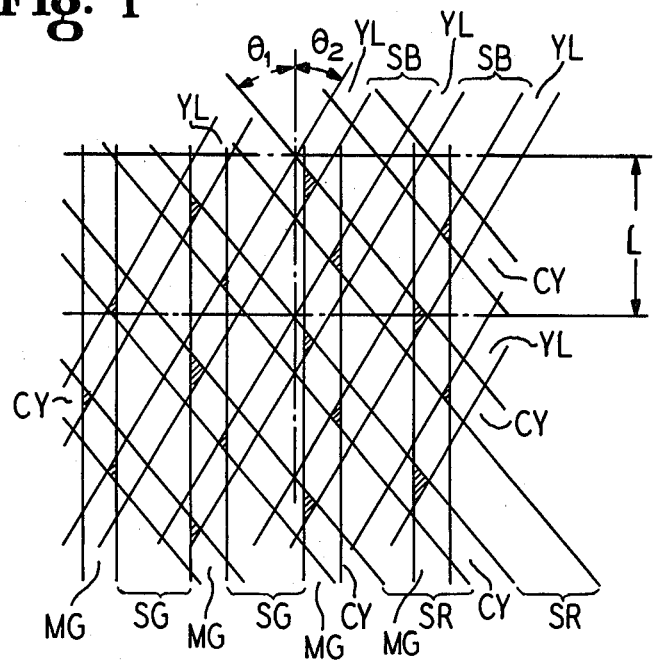
FIG. 1 is a front elevation view illustrating a portion of the stripe filter which is to be used in the invention.

FIG. 1 is a front elevation illustrating a portion of a striped filter of the color separation type which is used for practicing the invention. A plurality of equally spaced vertical stripes of MG (magenta) are formed on a transparent filter. A plurality of CY (cyan) stripes are formed at an angle $\theta_1$ on the filter base and extend at the angle $\theta_1$ relative to the magenta stripes. A plurality of yellow YL stripes extend parallel to each other and are formed on the filter base at an angle $\theta_2$ relative to the magenta stripes MG. The magenta stripes MG are formed in the direction which is at right angles to the scanning direction of the beam and the cyan and yellow stripes CY and YL are arranged in opposite directions relative to each other and at angles $\theta_1$ and $\theta_2$ to the magenta stripes. The stripe filter according to the invention is made by forming each of the yellow cyan and magenta stripes on a transparent plate and the stripes are superimposed upon each other and they can be formed by either the additive or subtractive color process.

Since the plate is transparent, the portions indicated $S_G$, $S_R$ and $S_B$ which are formed between the stripes MG, CY and YL will be transparent. Since magenta comprises the color red plus blue, the magenta stripes MG will not transmit green light, however, the transparent portions $S_G$ between the magenta stripes will transmit green light. Due to the repetition of the magenta stripes and the transparent portions of the filter, the green component signal of the output of the image pickup tube will be subjected to carrier modulation. Since cyan is green plus blue also the cyan stripes CY will not transmit red light but the transparent portions between them indicated by $S_R$ will transmit red light. As a result, due to repetition of the cyan and transparent portions of the filter, the red component signal of the output of the image pickup tube will be subjected to carrier modulation. Since yellow is red plus green, the blue component signal of the image pickup tube will be subject to carrier modulation due to the repetition of the yellow and the transparent portions $S_B$.

In the present embodiment, the respective inclination angles $\theta_1$ and $\theta_2$ of the cyan and yellow stripes CY and YL are designed such that each carrier of the red and blue components will have opposite phase relationship during each horizontal scanning. As shown in the frequency spectrum plot of FIG. 2, specifically a green component G is generated in phase with every horizontal scanning whereas the red and blue components R and B have their band centered on both sides of the green component and their phases are inverted during alternate horizontal scans as indicated in broken lines in the drawing. In this embodiment, the center frequencies of the respective components R, G and B, thus carrier modulated, are selected so that the center frequencies of the components $f_R = 3.6$ MHz, the center frequency of the green component $f_G=4.3$ MHz and the center frequency of the blue component $f_B=5.0$ MHz. The carrier frequencies are determined by the pitches of the respective stripes CY, MG and YL.

Figure 2:
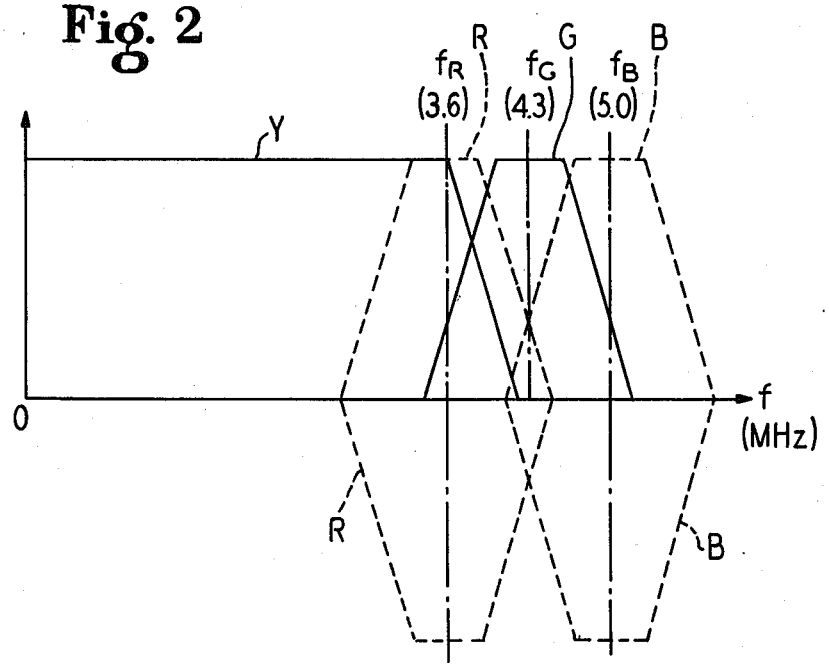
FIG. 2 is a graphical representation illustrating the frequency spectrum of the output of the mono-tube color image pickup device according to the present invention.
Figure 3:
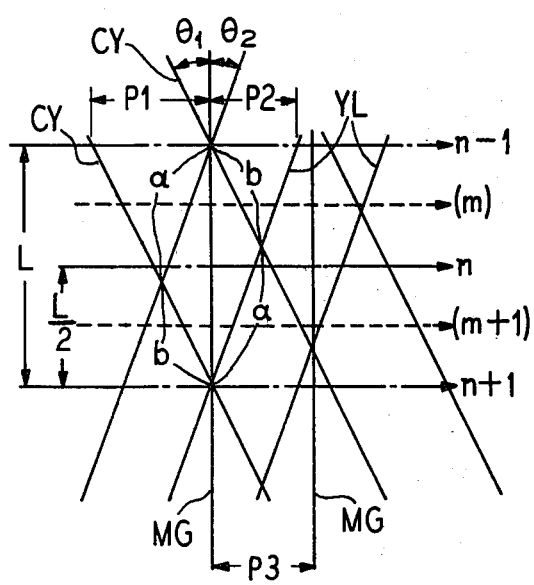
FIG. 3 is a chart for schematically illustrating the stripe filter of FIG. 1.

The following will describe how the angles $\theta_1$ and $\theta_2$ and the pitches of the stripes for generating the components result in the frequency spectrum illustrated in FIG. 2. FIG. 3 is a schematic chart illustrating the stripe filter shown in FIG. 1 wherein only the center lines of the respective stripes CY, MG and YL are illustrated. The intervals between the odd field scanning lines $n-1$, $n$, $n+1$ and so on and the even field scanning lines $m$, $m+1$ and so on are designated $L/2$. The repetition periods are pitches of the respective stripes of the cyan, yellow and magenta lines CY, YL and MG when the image surface to be picked up is scanned with an electron beam are designated as $P_1$, $P_2$ and $P_3$ respectively. If the cyan stripes CY are inclined such that they change one pitch $P_1$ for two horizontal scanning periods or two line intervals L, the carriers of the red component R will have phases which are alternately inverted for each horizontal section. Thus, the inclination is determined by the following equation:

$$\tan\theta_1 = (P_1/L) \quad (1)$$

In the same manner, if the yellow stripes YL have an inclination such that they are changed one pitch $P_2$ for two line intervals L, the carrier of the blue components B will have phases which are alternately inverted for each horizontal section. Therefore, the inclination is determined by the following equation:

$$\tan\theta_2 = (P_2/L) \quad (2)$$

As illustrated in FIG. 3, on the other hand, if the distances between the intersecting points of the respective stripes CY and YL are defined as a and b, then the following equations can be obtained:

$$P_3 = a\sin\theta_2 + b\sin\theta_1 \quad (3)$$

$$P_2 = b\sin\theta_1 + b\cos\theta_1 \cdot \tan\theta_2 \quad (4)$$

and $$P_1 = a\sin\theta_2 + a\cos\theta_2 + \tan\theta_1 \quad (5)$$

From equations (1) through (5), the pitch $P_3$ which is the distance between the magenta lines MG can be determined by the following equation:

$$P_3 = \frac{P_1 \cdot \sin\theta_2}{\sin\theta_2 + \cos\theta_2 \cdot \tan\theta_1} + \frac{P_2 \cdot \sin\theta_1}{\sin\theta_1 + \cos\theta_1 \cdot \tan\theta_2} \quad (6)$$

$$\frac{P_1}{1 + \frac{\tan\theta_1}{\tan\theta_2}} + \frac{P_2}{1 + \frac{\tan\theta_2}{\tan\theta_1}}$$

$$\frac{P_1 \cdot \tan\theta_2 + P_2 \cdot \tan\theta_1}{\tan\theta_1 + \tan\theta_2} = \frac{2L \cdot \tan\theta_1 \cdot \tan\theta_2}{\tan\theta_1 + \tan\theta_2}$$

Thus, if the pitches $P_1$ and $P_2$ are determined, the angles $\theta_1$ and $\theta_2$ can be determined from equations (1) and (2), and the pitch $P_3$ shown in equation (6) can be determined by the use of $\tan\theta_1$ and $\tan\theta_2$.

The width of the stripes CY, YL and MG can be determined as follows.

Figure 4A:
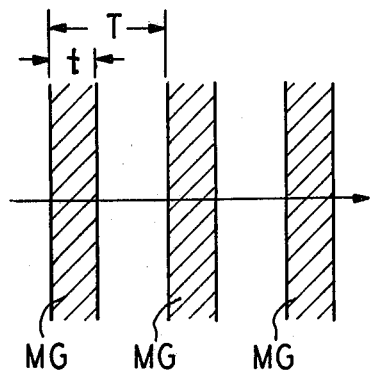
FIG. 4A is a front elevation of a portion of the stripe filter for Magenta.
Figure 4B:
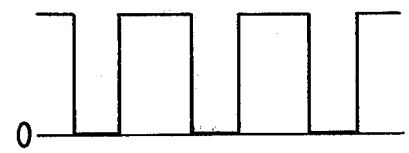
FIG. 4B is a wave form illustrating the video output when the image of a green object is picked up using the filter of FIG. 4A.
Figure 5:
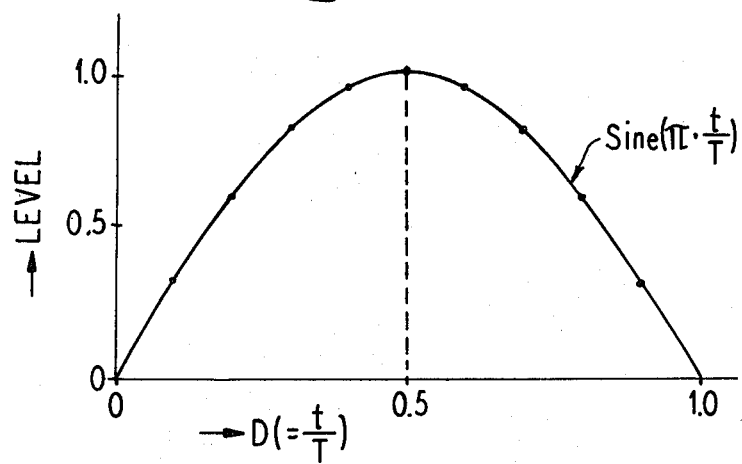
FIG. 5 is a graph illustrating the level of the fundamental component which has been produced by subjecting the signal shown in FIG. 4B to a Fourier transformation with the widths of the stripes of the filter of FIG. 4A being changed.

FIG. 4A illustrates the magenta stripes MG of the filter and FIG. 4B illustrates the wave form of the output of the image pickup tube when the image of a green object is picked up by the use of that filter. As shown in FIG. 4A, the pitch T and width t of the magenta stripes MG result in a square wave output having the same pitch T and pulse width t will be obtained as illustrated in FIG. 4B. The ratio of the width t to the pitch T of the magenta stripes MG is designated as $D=t/T$ and the square wave output is subjected to a Fourier transformation during the changing of the value of D from 0 to 1.0. The resultant levels of the fundamental component are plotted and illustrated in FIG. 5. As shown, the fundamental component will be maximum for $D=0.5$ and will be minimum for $D=0$ and $D=1.0$.

It is to be noted that the percentage of the transparent portion of the filter will decrease for larger values of D so that the luminance level will be lowered and the resolution will be degraded. As the value of D becomes larger on the other hand, the areas of the overlapping portions which are shown with hatch lines in the area in FIG. 1 in which the three color stripes CY, YL and MG overlap will increase and components having no chromatic information will be periodically generated which results in beat interference.

Due to the above described conditions, it is desirable that D is in the range of 0.25 to 0.5. In a particular embodiment, the value of D was preset at 0.35 for the magenta stripes, 0.38 for the cyan stripes and 0.40 for the yellow stripes.

In order to construct the stripe filter shown in FIG. 1, the inclined cyan and yellow stripes CY and YL are first formed on the transparent plate. Then the phase of the magenta stripes MG having a pitch of $P_3$ as defined by equation (6) is calculated using the angles $\theta_1$ and $\theta_2$ of the cyan and yellow stripes CY and YL such that the areas of the overlapping portions of the three colors CY, YL and MG are substantially equal to each other at the center portion of the filter.

The system for separating the chrominance components from the output of the image pickup tube using the stripe filter thus constructed can be accomplished as described hereafter.

In the present embodiment, since the red and blue components R and B have their phases inverted for every horizontal scan as shown in FIG. 2 one of the green components G will be in phase and the red and blue components R and B can be separated from each other, respectively by summing and subtracting the input and output of a one horizontal delay line.

Figure 6:
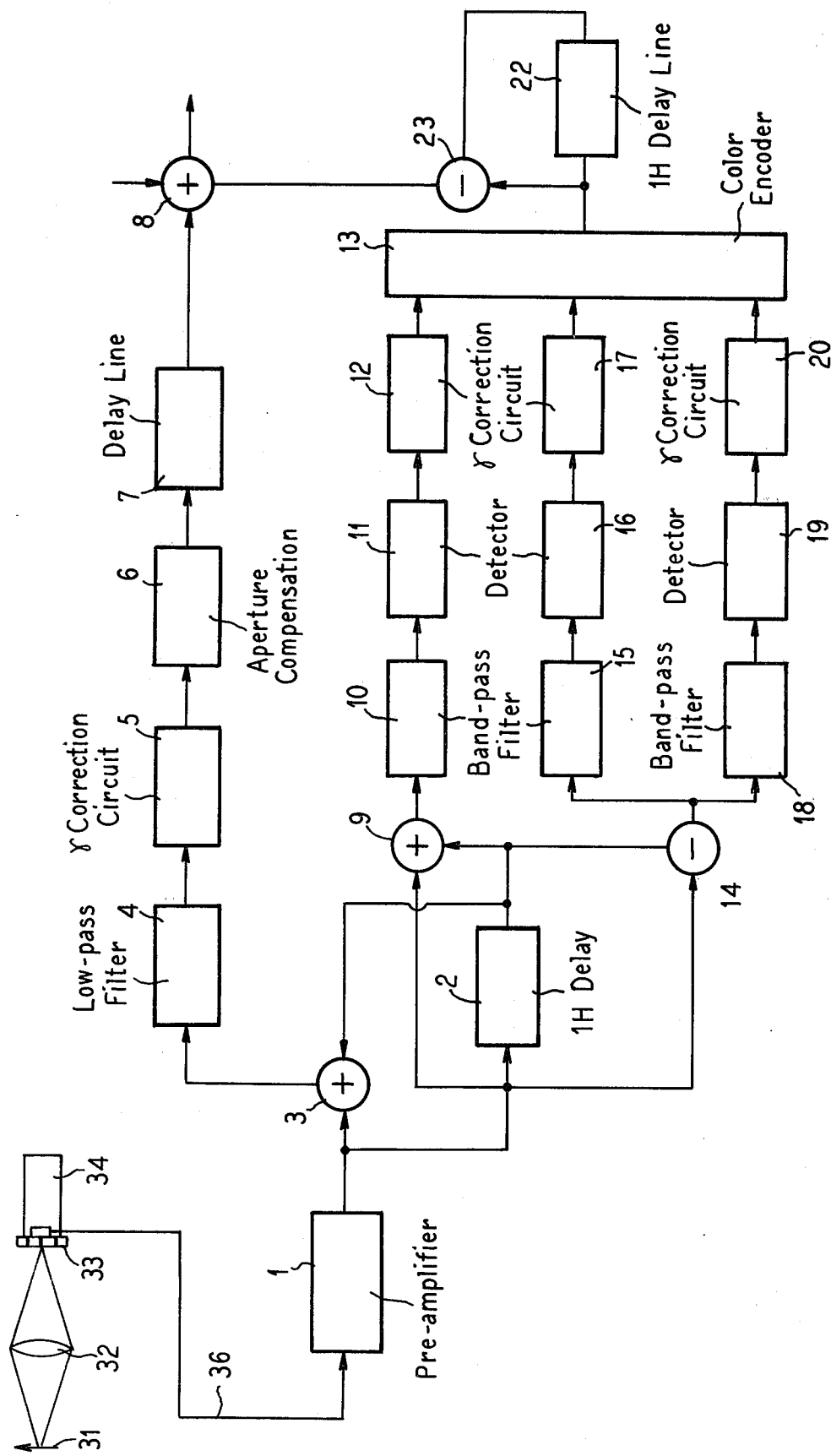
FIG. 6 is a block diagram of a processing circuit of the invention.

FIG. 6 is a block diagram illustrating a processing circuit according to the invention.

As shown in FIG. 6, an image 31 passes through a lens 32 and filter 33 according to the invention and is picked up by an image pickup tube for example a vidicon tube 34. The output of the vidicon tube 34 is supplied through a cable 36 to a preamplifier 1. The output of the image pickup tube 34 will have the frequency spectrum illustrated in FIG. 2. The output of the preamplifier 1 is supplied to a 1 H (horizontal period) delay line 2 and an adder 3 receives the input and output of the 1 H delay line 2 and thus the luminance component Y and the green component G illustrated in solid line in FIG. 2 are respectively separated so that each has a vertical correlation between adjacent horizontal scanning periods. The red component R and the blue component B each have opposite phase relationship for two horizontal scanning periods as illustrated in broken line and will be filtered out. The output of the adder 3 is fed to a low pass filter 4 which has a cutoff frequency of 4.3

MHz to separate the luminance component Y. The separated luminance component Y is fed from the filter 4 to a γ-correction circuit 5 which supplies its output to an aperture compensating circuit 6. A delay line 7 receives the output of the aperture compensating circuit 6 and makes a timing adjustment before supplying an output to another adder 8.

The input and output of the 1 H delay line 2 are also fed to another adder 9 so that the green component G contained in the output of the adder 9 is separated by passing it through a band pass filter 10 which has a pass band of 4.3±0.5 MHz. The output of the filter 10 is supplied to a detector 11 which eliminates the carrier and supplies an output to a detector 11 which passes the green component to a γ-corrector 12 which supplies its output to a color encoder 13. The input and output of the 1 H delay line 2 are also fed to a subtractor 14 and since the red and blue components R and G have their phases alternately inverted for each horizontal period H as illustrated in broken line in FIG. 2 they will be separated by the subtractor 14 and the green component G will be filtered out. The output of the subtractor 14 is fed through a band pass filter 15 which has a center frequency of 3.6±0.5 MHz pass band to separate the red component R which is then fed through a detector 16 and a γ-correction circuit 17 to the color encoder 13.

The output of the subtractor 14 is also fed through a band pass filter 18 which has a center frequency of 5.0±0.5 MHz which separates the blue component and it is fed through a detector 19 to a γ-corrector circuit 20 which supplies its output to the color encoder 13.

In the color enclouder 13, a color difference signal is formed from the three color components (G, R and B), and a chrominance signal C for a NTSC television system which is modulated with a color subcarrier is also prepared. The chrominance signal C which is the output of the color encoder 13 is fed to a comb-filter which comprises a one horizontal delay line 22 and a subtractor 23 connected as shown so as to produce a residual luminance component in which the cross-talk and beat interference component are filtered out of the chrominance signal C. The output of the comb-filter is fed to the adder 8 and it is mixed with the luminance signal Y and a synchronizing signal to generate a composite color video signal.

In the present invention, although the center band of the chrominance component is the green component or the end phase component, it is to be realized, of course, that either the red component or the blue component may be positioned at the center.

It is seen that according to the present invention the first chrominance component contained in the video output is generated in phase during every horizontal scan and the second and third chrominance components which have their frequency bands at both sides of the frequency of the first chrominance component are generated and have their phases inverted upon every horizontal scan. As a result, even if the band of frequencies of the respective chrominance components overlap each other the respective chrominance components can be separated under conditions of sufficiently low cross talk by utilizing the vertical correlation between the components which is delayed for one horizontal period and the original component so that the color reproduction will be excellent. Also, the frequency bands occupied by the chrominance components can be made narrower by overlapping the bands of the respective components so that the frequency band of the luminance component can be made sufficiently wide so as to obtain high resolution of the picture. Also, even if the higher frequency bands of the luminance component and the chrominance component, in other words, red in the present embodiment in the lower frequency band overlap each other, by chrominance component which is mixed with the luminance component can be completely filtered out with the use of the comb-filter so that the frequency band of the luminance component can be further extended to a higher frequency range.

According to the present invention also either the beat interference between the chrominance components or the quasi-video signal generated due to the spectrum chracteristic of the stripe filter of the γ-characteristic of the image pickup tube for the photo-electric conversion is subjected to phase inversion and is dispersed according to the phase inversions of the second and third chrominance components during every horizontal scan so that it is offset for every line on the picture such that it results in little interference with the luminance component. On the other hand, the beat interference or the quasi-video signal can be completely filtered out by using the comb-filter.

Also, since the three chrominance components are produced in a separated manner using substantially identical circuits, the fluctuations and distortion in the component due to change in the dark current of the image pickup tube as well as the change in the degree of modulation caused by the change in the quantity of light and the shading if any will be uniformly contained in the respective chrominance components so that they will cancel at the chrominance different signal stage of the MTSC system. As a result, the color reproduction balance and the white balance are excellent and are much improved over the prior art systems. Also, the construction of the processing circuit can be simplified because a variety of compensating circuits for compensating for fluctuations and distortions in the components of the circuit is not required.

Although the invention has been described with respect to preferred embodiments, it is not to be so limited as changes and modifications can be made which are within the full intended scope of the invention as defined by the appended claims.

I claim as my invention:

1. A color television camera system comprising an image pickup tube, color filter means for forming color separated images of a viewed object on said image pickup tube, and means for deriving composite color video signals from said image pickup tube representative of said color separated images, said color filter means having a first set of parallel color stripes for generating a first chrominance signal component having a first frequency band and having in-phase carrier with respect to every horizontal scanning, a second set of parallel color stripes and a third set of parallel color stripes for generating second and third chrominance signal components having frequency bands on both sides of said first frequency band, respectively with each carrier phase of said second and third chrominance signal components being reversed with respect to every horizontal scanning, wherein said first set of color stripes are oriented vertically and said second and third set of stripes are angularly displaced relative to each other and relative to said first set of color stripes and wherein the ratio of the width t to pitch T for each of said first, second and third set of color stripes is greater than 0.25 and less than 0.5.

2. A color television camera system in accordance with claim 1 further comprising, delay means for providing a delayed signal of said composite color video signals, means for adding said delayed signal to said composite color video signals, and first band pass filter means with a first band pass deriving said first chrominance signal from an output of said adding means.

3. A color television camera system in accordance with claim 2 further comprising means for subtracting said delayed signal from said composite color video signals, and second and third band pass filter means having second and third band passes for deriving said second and third chrominance signals, respectively, from an output of said subtracting means.

4. A color television camera system in accordance with claim 2, further comprising a filter means for deriving a luminance signal from said output of said adding means.

5. A color television camera system comprising an image pickup tube, a stripe filter mounted between said pickup tube and an object to be scanned, said stripe filter having a transparent plate, a first set of parallel equally spaced color stripes of a first color formed on said plate, a second set of parallel equally spaced color stripes of a second color formed on said plate, a third set of parallel equally spaced color stripes of a third color formed on said plate, said first set of color stripes orientated such that said pickup tube scans them at ninety degrees to their longitudinal axis and said second and third set of color stripes orientated relative to said first set at angles of $\theta_1$ and $\theta_2$ which are other than zero wherein the ratio of the width t to pitch T for each of said first, second and third set of color stripes is greater than 0.25 and less than 0.5 including, a first adder receiving the output of said pickup tube, a low pass filter receiving the output of said adder, a second adder receiving the output of said low pass filter, a first delay means receiving the output of said pickup tube and supplying an input to said first adder, a third adder receiving outputs from said pickup tube and said first delay means, a first band pass filter receiving the output of said third adder, a first detector connected to said first band pass filter, a first subtractor receiving inputs from said pickup tube and said first delay means, second and third band pass filters receiving the output of said first subtractor, a second detector receiving the output of said second band pass filter, a third detector receiving the output of said third detector, a color encoder receiving the outputs of said first, second and third detectors, and a comb-filter receiving the output of said color encoder and supplying an output to said second adder.

6. A color television camera system according to claim 5 including, a first adder receiving the output of said pickup tube, a low pass filter receiving the output of said adder, a second adder receiving the output of said low pass filter, a first delay means receiving the output of said pickup tube and supplying an input to said first adder, a third adder receiving outputs from said pickup tube and said first delay means, a first band pass filter receiving the output of said third adder, a first detector connected to said first band pass filter, a first subtractor receiving inputs from said pickup tube and said first delay means, second and third band pass filters receiving the output of said first subtractor, a second detector receiving the output of said second band pass filter, a third detector receiving the output of said third detector, a color encoder receiving the outputs of said first, second and third detectors, and a comb-filter receiving the output of said color encoder and supplying an output to said second adder.

7. A color television camera system according to claim 6 wherein said comb-filter comprises a second subtractor which receives the output of said color encoder and a second delay means which receives the output of said color encoder and supplies an input to said second subtractor.

8. A color television camera system according to claim 7 wherein the delay of said first and second delay means is one horizontal scan period.

* * * * *